(12) United States Patent
Duvdevany

(10) Patent No.: US 9,810,902 B1
(45) Date of Patent: Nov. 7, 2017

(54) OPENING ANGLE MEASUREMENT OF AN OSCILLATING MEMS MIRROR

(71) Applicant: STMicroelectronics Ltd, Netanya (IL)

(72) Inventor: Offir Duvdevany, Tel Aviv (IL)

(73) Assignee: STMicroelectronics Ltd, Netanya (IL)

( * ) Notice: Subject to any disclaimer, the term of this patent is extended or adjusted under 35 U.S.C. 154(b) by 0 days.

(21) Appl. No.: 15/192,718

(22) Filed: Jun. 24, 2016

(51) Int. Cl.
G02B 26/08 (2006.01)
G02B 26/10 (2006.01)
G01D 5/24 (2006.01)

(52) U.S. Cl.
CPC .......... G02B 26/0833 (2013.01); G01D 5/24 (2013.01); G02B 26/105 (2013.01)

(58) Field of Classification Search
CPC .......... G02B 26/0833; G02B 26/0841; G02B 26/002; G02B 26/08; G02B 26/105; G01D 5/24; G01D 5/2417; G01J 3/4532; G01J 3/4535; G01J 2003/2879
USPC ...................................................... 359/199.4
See application file for complete search history.

(56) References Cited

U.S. PATENT DOCUMENTS

| | | | |
|---|---|---|---|
| 8,553,308 B2 | 10/2013 | Goren et al. | |
| 8,817,359 B2 * | 8/2014 | Chau | G02B 26/002 |
| | | | 359/290 |

* cited by examiner

*Primary Examiner* — Euncha Cherry
(74) *Attorney, Agent, or Firm* — Gardere Wynne Sewell LLP

(57) ABSTRACT

A device disclosed herein includes a feedback measuring circuit to measure a signal flowing through a movable MEMS mirror. Processing circuitry determines a time at which the signal indicates that a capacitance of the movable MEMS mirror is substantially at a maximum capacitance. The processing circuitry also determines, over a window of time extending from the time at which the signal indicates that the capacitance of the movable MEMS mirror is substantially at the maximum to a given time, a total change in capacitance of the movable MEMS mirror compared to the maximum capacitance. The processor further determines the capacitance at the given time as a function of the total change in capacitance, and determines an opening angle of the movable MEMS mirror as a function of the capacitance at the given time.

23 Claims, 5 Drawing Sheets

OPENING ANGLE MEASUREMENT OF AN OSCILLATING MEMS MIRROR

TECHNICAL FIELD

This disclosure relates to optical systems for scanning or deflecting light beams, and, in particular, to determining and controlling the opening angles of an oscillating mirror in a MEMS device.

BACKGROUND

Certain devices such as wafer defect scanners, laser printers, document scanners, projectors and the like often employ a collimated laser beam that scans across a flat surface in a straight line path. These devices employ tilting mirrors to deflect the beam to perform the scanning. These tilting mirrors may be, or may include, Micro Electro Mechanical Systems ("MEMS") devices.

Common mirrors used in MEMS devices include a stator and a rotor, with the rotor or structures carried by the rotor being reflective. The stator and/or rotor are driven with a drive signal which results in the rotor rotating with respect to the stator, thereby changing the angle of reflectance of an incident light beam on the rotor. By oscillating the rotor between two orientations, an opening angle of the mirror is defined, and scanning of the light beam across the flat surface is accomplished.

It is desirable to be able to precisely control movement of the rotor. To enable that precise control, collection of accurate data about the current position of the mirror is important. The collection of such accurate data, and consequently the precise control of the mirror, has proven troublesome due to changes in temperature, changes to the light beam itself, and other factors. This can result in commercially undesirable performance of the device. Thus, there is a commercial desire for the development of accurate ways to measure data about the position of the mirror, and precise ways to control the position of the mirror, are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A device disclosed herein includes a feedback measuring circuit to measure a signal flowing through a movable MEMS mirror. Processing circuitry determines a time at which the signal indicates that a capacitance of the movable MEMS mirror is substantially at a maximum capacitance. The processing circuitry also determines, over a window of time extending from the time at which the signal indicates that the capacitance of the movable MEMS mirror is substantially at the maximum to a given time, a total change in capacitance of the movable MEMS mirror compared to the maximum capacitance. The processor further determines the capacitance at the given time as a function of the total change in capacitance, and determines an opening angle of the movable MEMS mirror as a function of the capacitance at the given time.

A method aspect disclosed herein is a method of controlling an opening angle of a movable MEMS mirror. The method includes driving the movable MEMS mirror with a periodic signal such that the MEMS mirror oscillates, measuring a signal flowing through the movable MEMS mirror as it oscillates, and determining a time at which the signal indicates that a capacitance of the movable MEMS mirror is substantially at a maximum capacitance. The method also includes determining, over a window of time extending from the time at which the signal indicates that the capacitance of the movable MEMS mirror is substantially at the maximum to a given time, a total change in capacitance of the movable MEMS mirror compared to the maximum capacitance. The capacitance at the given time is determined as a function of the total change in capacitance. An opening angle of the movable MEMS mirror is determined as a function of the capacitance at the given time. The opening angle of the movable MEMS mirror is determined based upon the opening angle not being equal to a desired opening angle.

Another method disclosed herein includes measuring a signal flowing through a movable MEMS mirror as it oscillates, and determining a time at which the signal indicates that a capacitance of the movable MEMS mirror is substantially at a maximum capacitance. This method also includes determining, over a window of time extending from the time at which the signal indicates that the capacitance of the movable MEMS mirror is substantially at the maximum to a given time, a total change in capacitance of the movable MEMS mirror compared to the maximum capacitance, and determining the capacitance at the given time as a function of the total change in capacitance.

DETAILED DESCRIPTION

Figure 1:
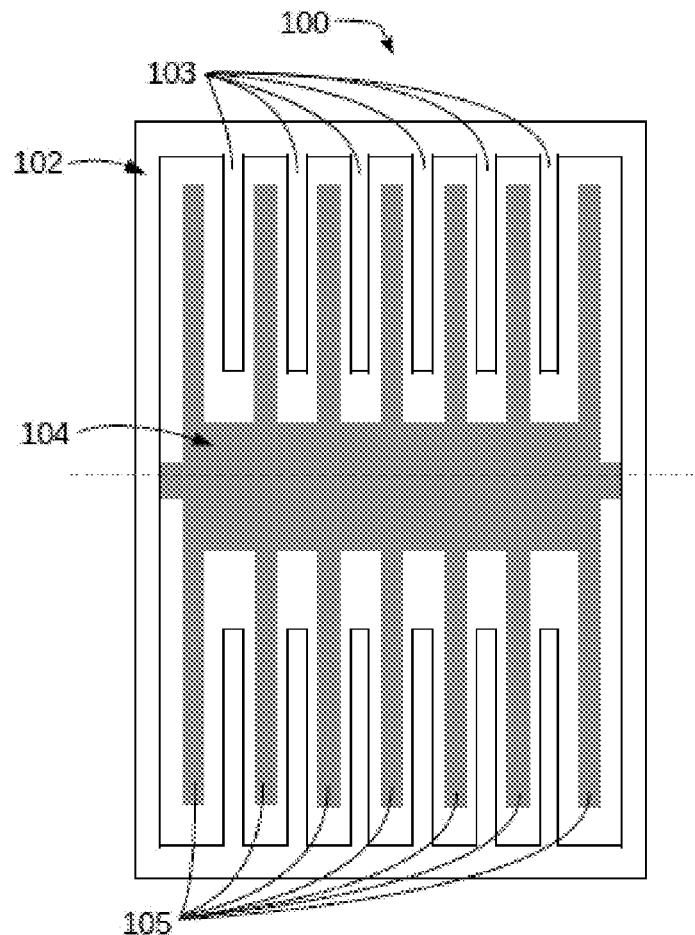
FIG. 1 is a top plan view of a movable MEMS mirror as may be used with the techniques described in this disclosure.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, indicate similar elements in other applications or embodiments.

First, a movable MEMS mirror 100, such as may be used in devices such as wafer defect scanners, laser printers, document scanners, projectors, and pico-projectors, will now be described with reference to FIG. 1. The movable MEMS mirror 100 includes a stator 102 having inwardly projecting fingers 103. A rotor 104 is positioned within the stator 102 and has outwardly projecting fingers 105 that interleave with the inwardly projecting fingers 103 of the stator 102. The rotor 104 spins about its axis, rotating its mirror surface with respect to the stator 102.

Either the stator 102 or the rotor 104 is supplied with a periodic signal, such as a square wave, while the other is supplied with a reference voltage. In the case where the periodic signal has an oscillating square voltage, for example, electrostatic forces cause the rotor 104 to rotate about its axis relative to the stator 102. In the case where the periodic signal has an oscillating square current, for example, magnetic forces cause the rotor 104 to rotate about its axis relative to the stator 102. Indeed, the movable MEMS mirror 100 may be driven according to any suitable way known to those of skill in the art.

Figure 2:
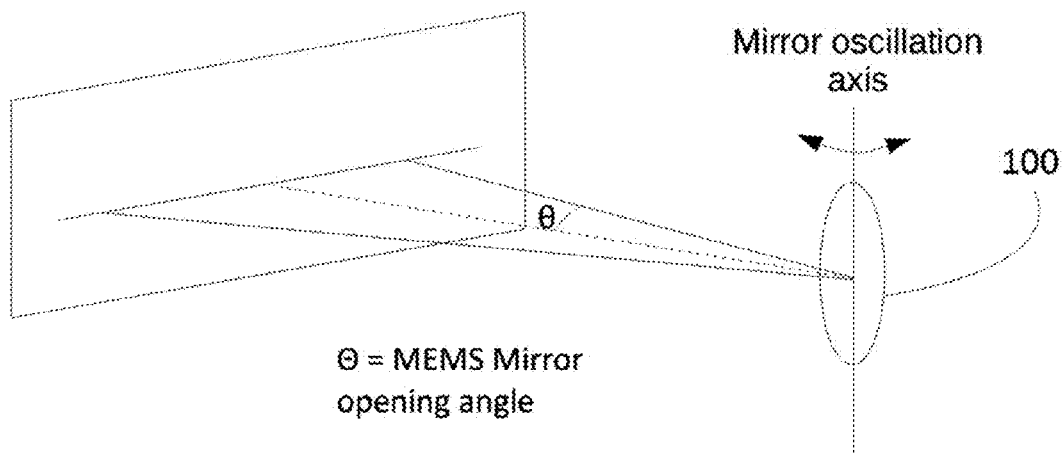
FIG. 2 is a perspective view showing operation of a movable MEMS mirror scanning in accordance with the techniques described in this disclosure.

For use in scanning a light beam across a surface, the movable MEMS mirror 100 is driven so that it oscillates at its resonant frequency between two set or controllable rotation limits. Shown in FIG. 2 is the movable MEMS mirror 100 scanning a light beam across a projection screen between two set rotation limits that define an "opening angle" θ of the movable MEMS mirror 100.

A system 200 for measuring and controlling the opening angle of the movable MEMS mirror 100 is now described with reference to FIG. 3A. The system 200 includes a current sensing operational amplifier 202 having an inverting input coupled to the rotor of the movable MEMS mirror 100, and a non-inverting input coupled to ground. A microcontroller 204 has an input coupled to receive the output of the operational amplifier 202. It should be appreciated that although a microcontroller 204 is shown, any suitable circuitry, such as a programmable logic device or programmable logic controller, may be used instead.

The microcontroller 204 includes a hardware integrator 212 that integrates the amplified signal received from the amplifier 202. An analog to digital converter (ADC) 214 samples and digitizes the output of the integrator 212, and delivers its output to a microprocessor 216. It should be understood that in the case where a programmable logic device or programmable logic controller is used, the microprocessor 216 may represent electrical circuits such as logic gates, amplifiers, and various arrangements of transistors. The output of the microprocessor 216 is coupled to a driver 99, which in turn is coupled to the movable MEMS mirror 100.

The operation of the system 200 will be described below, but first the relationship between a capacitance between the stator 102 and rotor 104 and the opening angle of the movable MEMS mirror 100 will be described.

Figure 4:
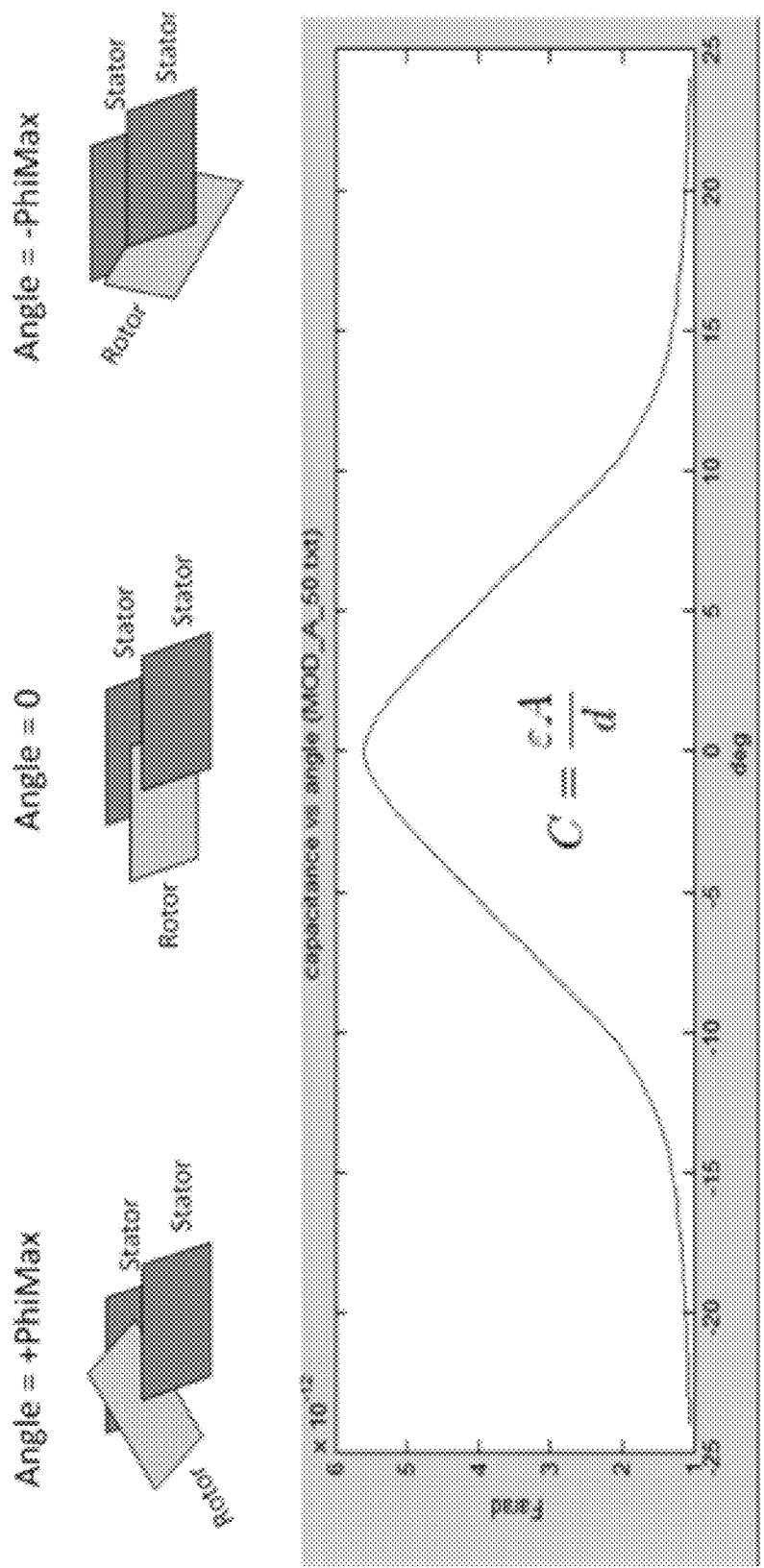
FIG. 4 is a graph of capacitance vs opening angle of a movable MEMS mirror.
Figure 5:
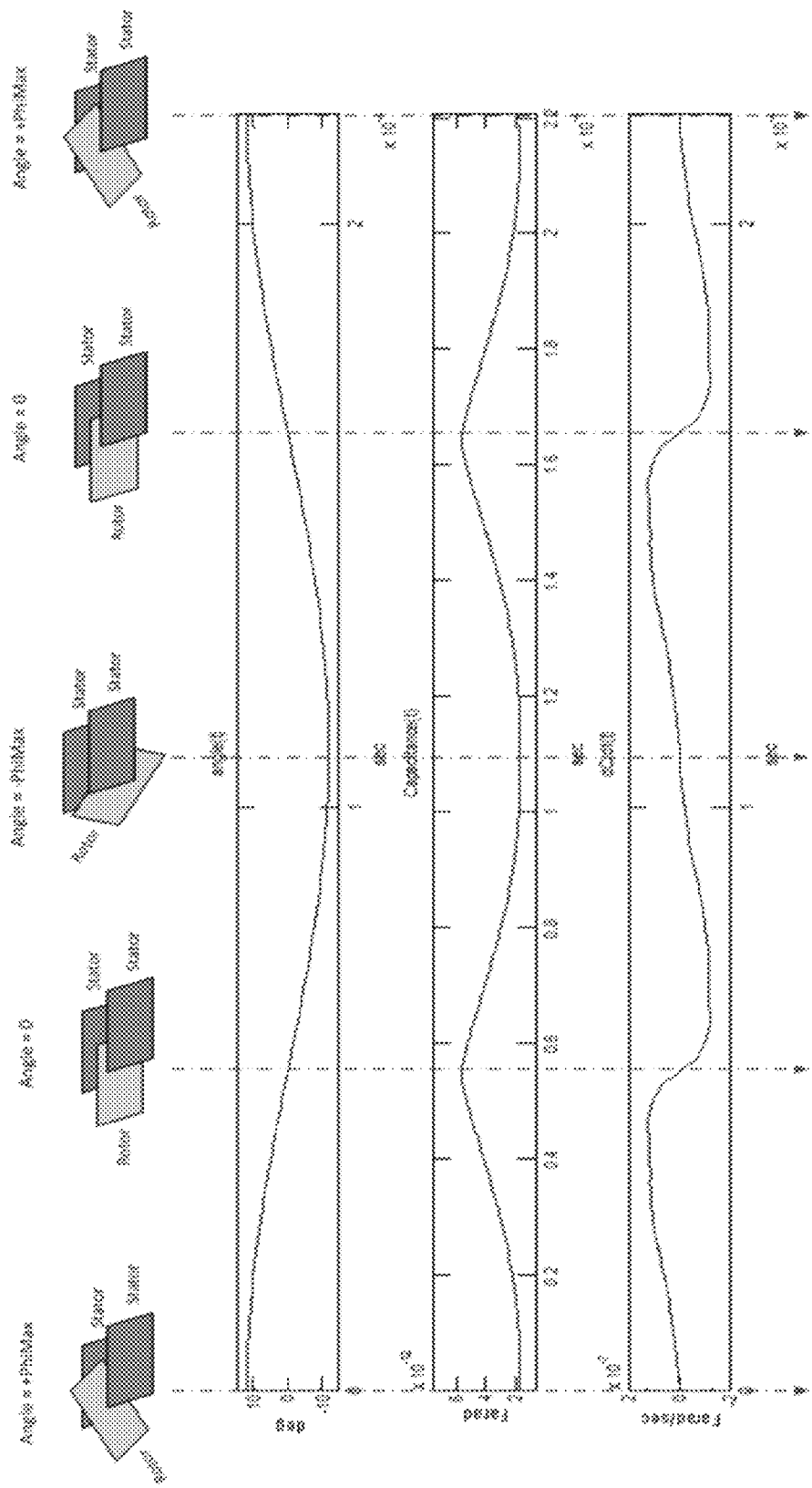
FIG. 5 is a series of graphs that demonstrate typical capacitance changes as a movable MEMS mirror resonates.
Figure 6:
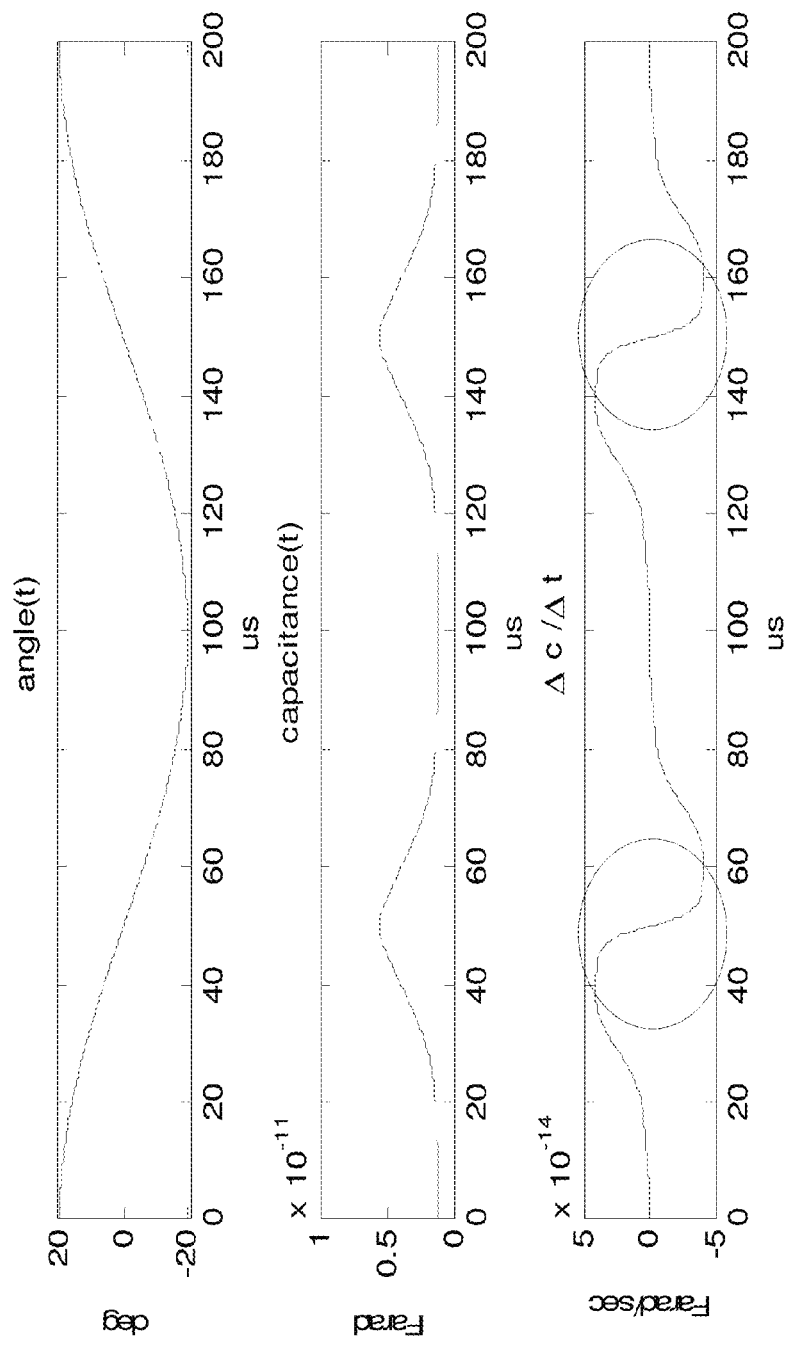
FIG. 6 is another series of graphs that demonstrate typical capacitance changes as a movable MEMS mirror resonates.

The capacitance between the stator 102 and rotor 104 varies as a function of the opening angle of the movable MEMS mirror 100, as shown in FIGS. 4-6. Mathematically, the charge on a capacitor is equal to the capacitance across the capacitor multiplied by the voltage across the capacitor, which can be represented as:

$$Q(t) = C(t) * V(t)$$

The current through the capacitor is equal to the derivative of the charge with respect to time, which can be represented mathematically as:

$$I(t) = \frac{dQ(t)}{dt} = V(t) * \frac{dC}{dt} + C(t) * \frac{dV}{dt}, C(t) = f(\phi(t))$$

Since V(t) is constant at the time of sampling, the $$C(t) * \frac{dV}{dt}$$

term cancels out, and I(t) is dependent on the change in capacitance.

The graph of FIG. 4 shows how capacitance is a function of the opening angle, and typical values for $$\frac{dC}{dt}$$

are shown in FIGS. 5-6.

Operation of the system 200 will now be described referring back to FIG. 3A. The amplifier 202 receives the output signal from the rotor of the MEMS mirror 100, and amplifies it by a factor of K. After amplification, this signal can be represented as:

$$\text{Signal}(t) = K \cdot \frac{dC(t)}{dt} + \text{Offset}$$

The offset can be ignored for the purposes of the techniques described herein. The purpose of the amplifier 202 and the amplification factor K is to amplify the signal such that changes due to capacitance changes of the MEMS mirror 100 are sampleable by the ADC 214.

As the rotor of the MEMS mirror 100 rotates, a maximum capacitance exists between the rotor and stator at the instant when the rotor is parallel to the plane of the stator. At this instant, the change in capacitance, and thus $$\frac{dC(t)}{dt},$$

is zero. Thus, the time at which the capacitance is at a maximum is known.

$$\text{Signal}(t_{maxCapacitance}) = K \cdot \frac{dC(t_{maxCapacitance})}{dt}$$

If the sum of the changes in capacitance from the time at which the capacitance is at a maximum until a given time T2 at which it is desired to know the opening angle of the MEMS mirror 100 is taken, the total change in capacitance from the maximum capacitance is known. This can be calculated as:

$$\Delta C(t_2) = \frac{1}{K} \int_{t_{maxCapacitance}}^{t_2} \text{Signal}(t)dt$$

This integration is performed by the integrator 212. The ADC 214 samples the output of the integrator 212, and then the microprocessor 216 calculates the capacitance at time T2 from $\Delta C(t_2)$ as:

$$C(t_2) = C_{max} + \Delta C(t_2)$$

Having calculated the capacitance at time T2, the opening angle of the MEMS mirror 100 at time T2 $\phi(t_2)$ can thus, as shown in FIG. 4, be determined as:

$$\phi(t_2) = f(C(t_2))$$

Usually, K is stable and determined by the value of the resistor R in the feedback path of the amplifier 202. However, in some instances, due to environmental conditions such as temperature, the amplification factor K may change. Therefore, optionally, normalization may be performed together with the integration. Thus, $\Delta C(t_2)$ may be calculated as:

$$\Delta C_{normalized}(t_2) = \frac{1}{\text{Signal}(t_{maxCapacitance})} \int_{t_{maxCapacitance}}^{t_2} \text{Signal}(t)dt$$

This helps to make the determination of the opening angle of the MEMS mirror 100 accurate and robust over a wide range of environmental conditions.

It should be appreciated that the hardware integrator 112 need not be used, and that this function may be performed digitally by the microprocessor 116. An embodiment where the microprocessor 116 may perform the integration is shown in FIG. 3B.

Figure 3A:
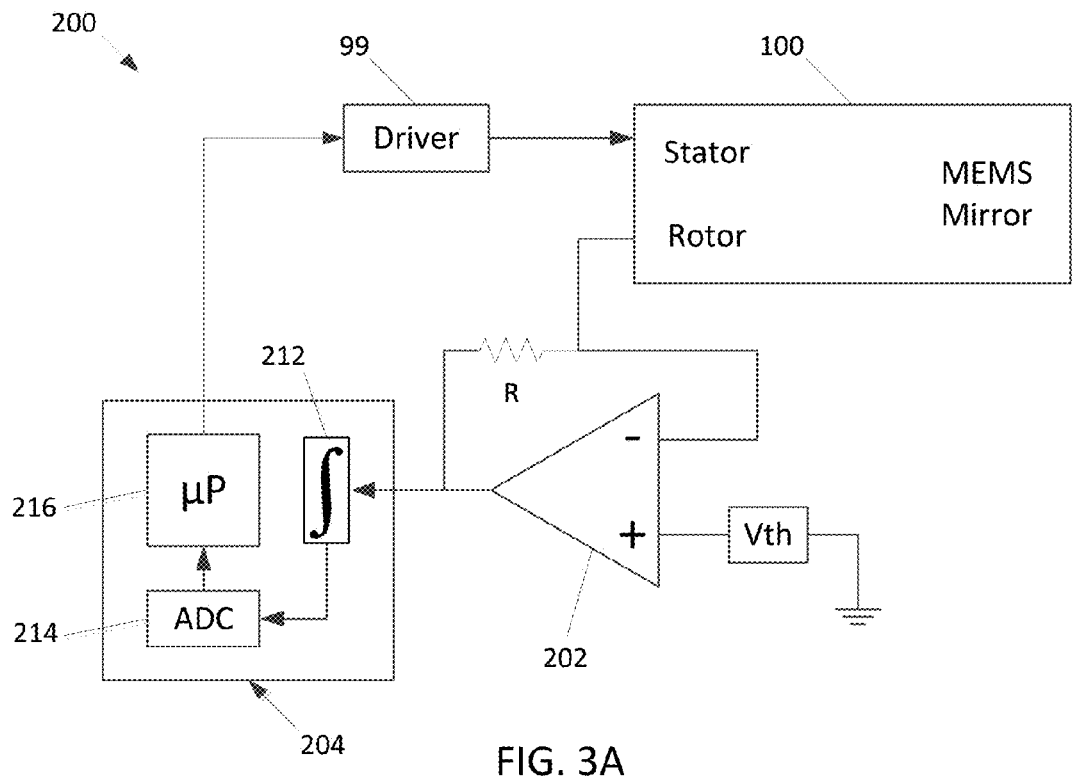
FIG. 3A is a schematic block diagram of a system for measuring and controlling the opening angle of a MEMS mirror that utilizes a hardware integrator in accordance with the techniques described in this disclosure.
Figure 3B:
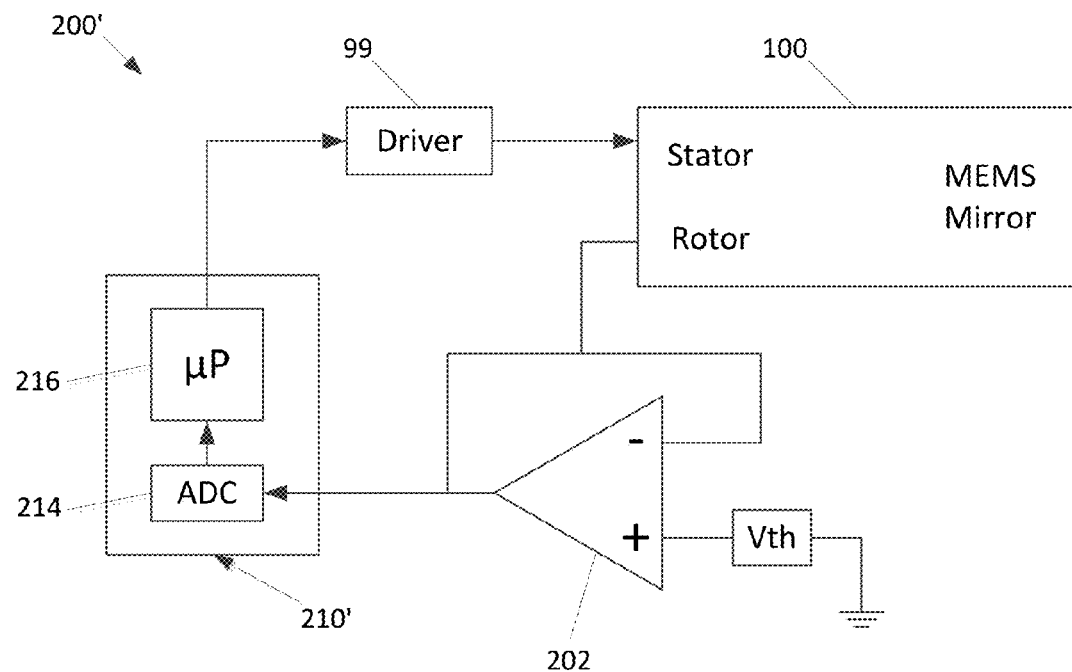
FIG. 3B is a schematic block diagram of a system for measuring and controlling the opening angle of a MEMS mirror in accordance with the techniques described in this disclosure.

The system 200' shown in FIG. 3B operates as the system 200 of FIG. 3A, except the hardware integrator is not present, and the output of the amplifier 202 is fed directly to the input of the ADC 214. As stated, here, the microprocessor 116 may perform the integration.

In some instances, however, with this embodiment, a linear approximation may be used rather than an integration. As can be seen from FIG. 6, about the maximum capacitance, the signal remains substantially linear. Thus, where T2 is sufficiently close to the time at which the capacitance is at a maximum, the signal $$\frac{dC(t)}{dt}$$

can be treated as linear, and $\Delta C(t_2)$ can be calculated as:

$$\Delta C(t_2) = \frac{1}{K} \int_{t_{maxCapacitance}}^{t_2} \text{Signal}(t)dt =$$
$$\frac{1}{K}\left((t_2 - t_{maxCapacitance}) \cdot \frac{\text{Signal}(t_2) - \text{Signal}(t_{maxCapacitance})}{2}\right)$$

This linear approximation technique may be advantageous when it is desired to save processing power, or to calculate the opening angle of the MEMS mirror 100 quickly without the use of a hardware integrator.

The determined opening angle of the MEMS mirror 100 can be used for controlling the opening angle in real time. The microprocessor 116 can use this opening angle to determine a gain to be applied to the driving period signal by the driver 99 which will result in the opening angle changing to a desired value. Thus, the opening angle can be used to create a control loop capable of not only precisely keeping the opening angle at a desired value, but also for changing the opening angle to a different desired value.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A device, comprising:
   a feedback measuring circuit configured to measure a signal flowing through a movable MEMS mirror;
   processing circuitry configured to:
   determine a time at which the signal indicates that a capacitance of the movable MEMS mirror is substantially at a maximum capacitance;
   determine, over a window of time extending from the time at which the signal indicates that the capacitance of the movable MEMS mirror is substantially at the maximum to a given time, a total change in capacitance of the movable MEMS mirror compared to the maximum capacitance;
   determine the capacitance at the given time as a function of the total change in capacitance;
   determine an opening angle of the movable MEMS mirror as a function of the capacitance at the given time.

2. The device of claim 1, wherein the device further comprises the movable MEMS mirror, and a driver configured to drive the movable MEMS mirror with a periodic signal such that the MEMS mirror oscillates at its resonance frequency.

3. The device of claim 1, wherein the feedback measuring circuit comprises an amplifier configured to receive the signal and to output an amplified version of the signal.

4. The device of claim 3, wherein the processing circuitry further comprises an analog to digital converter configured to receive the amplified version of the signal and to generate a digitized version of the signal.

5. The device of claim 3, wherein the processing circuitry further comprises:
   a hardware integrator configured to determine the total change in capacitance of the movable MEMS mirror compared to the maximum capacitance by integrating the amplified version of the signal over the window of time extending from the time at which the signal indicates that the capacitance of the movable MEMS mirror is substantially at the maximum to the given time; and
   an analog to digital converter configured to receive the integrated and amplified version of the signal and to generate a digitized signal based thereupon.

6. The device of claim 5, wherein the processing circuitry further comprises a microprocessor configured to determine the capacitance at the given time and determine the opening angle of the movable MEMS mirror.

7. The device of claim 5, wherein the processing circuitry is configured to normalize the amplified version of the signal; and wherein the hardware integrator integrated the normalized amplified version of the signal.

8. The device of claim 1, wherein the processing circuitry determines the total change in capacitance of the movable MEMS mirror compared to the maximum capacitance without integration and as a function of the signal at the given time, the signal at the time at which the signal indicates that the capacitance of the movable MEMS mirror is substantially at the maximum capacitance, the given time, and the time at which the signal indicates that the capacitance of the movable MEMS mirror is substantially at the maximum capacitance.

9. The device of claim 8, wherein the processing circuitry determines the total change in capacitance of the movable MEMS mirror compared to the maximum capacitance without integration and as a function of a difference between a value of the signal at the given time and a value of the signal at the time at which the signal indicates that the capacitance of the movable MEMS mirror is substantially at the maximum capacitance, multiplied by a difference between the given time and the time at which the signal indicates that the capacitance of the movable MEMS mirror is substantially at the maximum capacitance.

10. The device of claim 1, wherein the processing circuitry is further configured to control the opening angle of the movable MEMS mirror as a function of the capacitance at the given time.

11. The device of claim 10, wherein the processing circuitry controls the opening angle of the movable MEMS mirror by causing the driver to change the periodic signal so that the capacitance at the given time equals a value associated with a desired opening angle.

12. The device of claim 11, wherein the driver changes the periodic signal by changing a voltage of the periodic signal.

13. The device of claim 11, further comprising a projector housing carrying the movable MEMS mirror, driver, feedback measuring circuit, and processing circuitry.

14. A method of controlling an opening angle of a movable MEMS mirror, comprising:
driving the movable MEMS mirror with a periodic signal such that the MEMS mirror oscillates;
measuring a signal flowing through the movable MEMS mirror as it oscillates;
determining a time at which the signal indicates that a capacitance of the movable MEMS mirror is substantially at a maximum capacitance;
determining, over a window of time extending from the time at which the signal indicates that the capacitance of the movable MEMS mirror is substantially at the maximum to a given time, a total change in capacitance of the movable MEMS mirror compared to the maximum capacitance;
determining the capacitance at the given time as a function of the total change in capacitance;
determining an opening angle of the movable MEMS mirror as a function of the capacitance at the given time;
changing the opening angle of the movable MEMS mirror based upon the opening angle not being equal to a desired opening angle.

15. The method of claim 14, further comprising amplifying the signal; and wherein the total change in capacitance of the movable MEMS mirror compared to the maximum capacitance is determined by integrating the amplified version of the signal over the window of time extending from the time at which the signal indicates that the capacitance of the movable MEMS mirror is substantially at the maximum to the given time.

16. The method of claim 15, wherein the amplified version of the signal is normalized prior to the integration.

17. The method of claim 14, wherein the total change in capacitance of the movable MEMS mirror compared to the maximum capacitance without integration is determined as a function of the signal at the given time, the signal at the time at which the signal indicates that the capacitance of the movable MEMS mirror is substantially at the maximum capacitance, the given time, and the time at which the signal indicates that the capacitance of the movable MEMS mirror is substantially at the maximum capacitance.

18. The method of claim 17, wherein the total change in capacitance of the movable MEMS mirror compared to the maximum capacitance is determined without integration and as a function of a difference between a value of the signal at the given time and a value of the signal at the time at which the signal indicates that the capacitance of the movable MEMS mirror is substantially at the maximum capacitance, multiplied by a difference between the given time and the time at which the signal indicates that the capacitance of the movable MEMS mirror is substantially at the maximum capacitance.

19. A method, comprising:
measuring a signal flowing through a movable MEMS mirror as it oscillates;
determining a time at which the signal indicates that a capacitance of the movable MEMS mirror is substantially at a maximum capacitance;
determining, over a window of time extending from the time at which the signal indicates that the capacitance of the movable MEMS mirror is substantially at the maximum to a given time, a total change in capacitance of the movable MEMS mirror compared to the maximum capacitance; and
determining the capacitance at the given time as a function of the total change in capacitance.

20. The method of claim 19, further comprising amplifying the signal; and wherein the total change in capacitance of the movable MEMS mirror compared to the maximum capacitance is determined by integrating the amplified version of the signal over the window of time extending from the time at which the signal indicates that the capacitance of the movable MEMS mirror is substantially at the maximum to the given time.

21. The method of claim 20, wherein the amplified version of the signal is normalized prior to the integration.

22. The method of claim 19, wherein the total change in capacitance of the movable MEMS mirror compared to the maximum capacitance without integration is determined as a function of the signal at the given time, the signal at the time at which the signal indicates that the capacitance of the movable MEMS mirror is substantially at the maximum capacitance, the given time, and the time at which the signal indicates that the capacitance of the movable MEMS mirror is substantially at the maximum capacitance.

23. The method of claim 22, wherein the total change in capacitance of the movable MEMS mirror compared to the maximum capacitance is determined without integration and as a function of a difference between a value of the signal at the given time and a value of the signal at the time at which the signal indicates that the capacitance of the movable MEMS mirror is substantially at the maximum capacitance, multiplied by a difference between the given time and the time at which the signal indicates that the capacitance of the movable MEMS mirror is substantially at the maximum capacitance.

* * * * *